April 29, 1952     A. J. HAGOPIAN     2,595,137

WORK HOLDER

Filed June 21, 1950

INVENTOR.
Avides J. Hagopian
BY Ross & Ross
attorneys

Patented Apr. 29, 1952

2,595,137

UNITED STATES PATENT OFFICE 2,595,137

WORK HOLDER

Avides J. Hagopian, Springfield, Mass.

Application June 21, 1950, Serial No. 169,441

2 Claims. (Cl. 90—59)

This invention relates to improvements in tools and is directed more particularly to apparatus for holding work for various machining apparatus.

The principal objects of the invention are directed to the provision of apparatus for holding a piece of work which is adapted to be supported by various machine tools such as a drilling machine, shaper, milling machine or the like.

A piece of work to be operated upon may be held and positioned as may be desired relative to a tool to be brought to the work while the apparatus is characterized by its adjustability for moving and positioning the work with ease and positivenesss.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Figure 1:
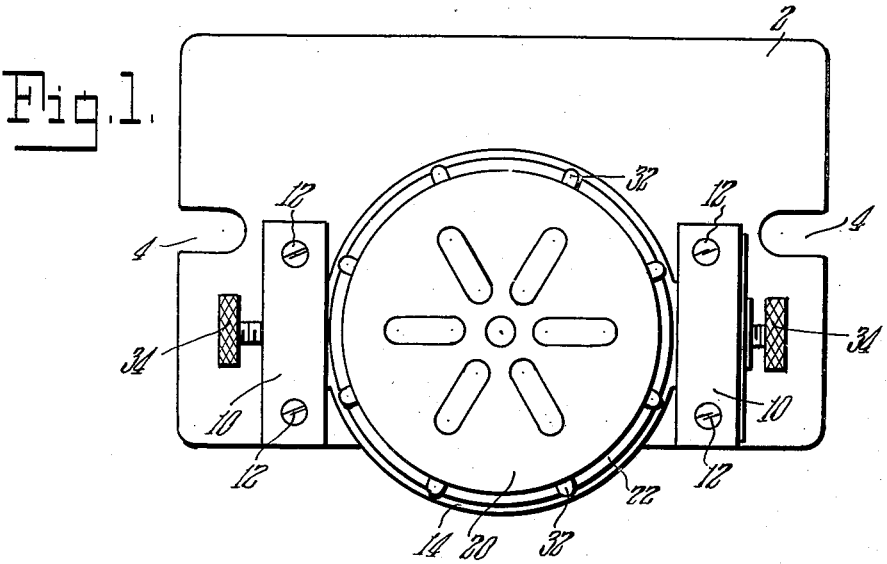
Fig. 1 is a plan view of a work holding device embodying the novel features of the invention.
Figure 2:
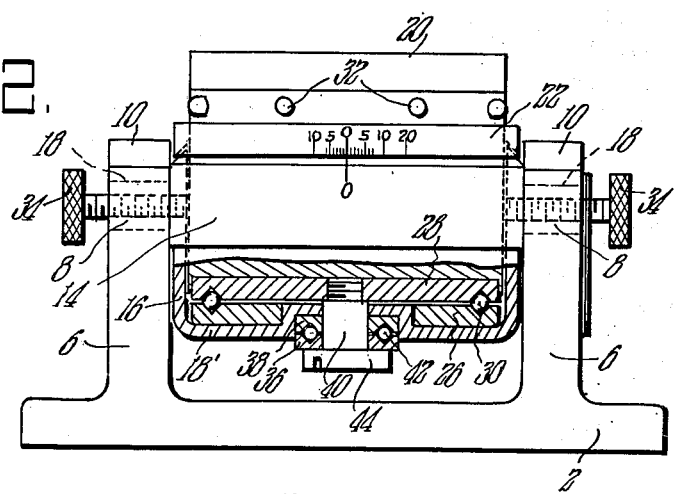
Fig. 2 is a front elevational view of the device shown in Fig. 1.
Figure 3:
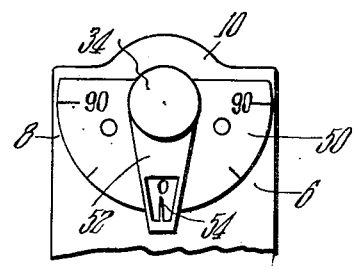
Fig. 3 is a partial end elevational view of the device shown in Figs. 1 and 2.

Referring now to the drawings more in detail, the invention will be fully described.

A base is shown at 2 which may have a plurality of bolt slots 4 for securing the device to the table or bed of various machines, such as a drill press, grinder, milling machine or the like.

Uprights 6 extend upwardly from the base in spaced relation and on upper sides have bearing portions 8 and caps 10 are secured thereto by bolts 12, or the like.

A bowl shaped housing or casing 14 having a circular side wall 16 and a lower wall 18 is provided with journals 18' at opposite sides thereof which are rotatable in the bearings.

A magnetic chuck 20 cylindrical in form and preferably of the permanently magnetized type is provided which has a ring 22 secured therearound, in any suitable manner. The ring 22 may be pressed on to the chuck or otherwise secured thereto.

A lower ball race 26 is provided on the lower wall 18 of the housing and a similar ball race 28 is provided on the lower end of the chuck. A series of balls 30 in cooperation with the races provide means for substantially frictionless rotation of the chuck relative to the housing. Preferably there will be slight clearance between the sides of the chuck and adjacent wall of the housing.

Manually engageable projections 32, are provided on the chuck to facilitate rotation thereof and indicia on the ring 22 and housing 14, as shown, are provided to facilitate turning the chuck through a desired predetermined angle and positioning the same as may be desired.

Clamp screws 34 in threaded engagement with the journals 18' are adapted to engage opposite sides of the chuck when screwed inwardly and thereby hold said chuck against turning and in adjusted position relative to the housing.

Ball races 36 and 38 around a screw 40 have a series of balls 42 therebetween. The race 38 is disposed in a socket of the lower wall of the housing, as shown, while the race 36 is supported by head 44 of the screw 40. The upper end of the screw 40 is in threaded engagement with ball race 28. The screw 40 may be adjusted to hold the race 28 and thereby the chuck and lower wall 18 of the housing against unwanted relative axial movement thereof while at the same time permitting the desired free rotation of the chuck in the housing.

A segment 50 carrying indicia, as shown, is secured to one member 6 of the support and an arm 52 is secured to a trunnion 18' of the housing which has an indexing member 54 for registering with the indicia. Thus, the housing and thereby the chuck may be tilted to any desired angle.

Means for securing the housing in tilted position may include any desired means but in one way the screws 12 may be employed to cause the caps 10 to clamp the journals.

Thus, with the member 2 secured to the table or bed of a machine tool the housing by rotation and/or tilting thereof may position work held by the chuck relative to a tool for operating on the work. Obviously the device may be used for various and numerous machining operations such as drilling, milling, boring, grinding, or the like.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Work holding apparatus comprising in combination, a support having transversely spaced vertically extending bearing members, a housing between said bearing members in the form of a cup open at its upper side and provided with journals on opposite sides thereof rotatable in said bearing members for swinging of said housing on a horizontal axis, said cup provided with a lower wall, a magnetized chuck within said housing having an upper work supporting face and a lower face, ball races carried by the lower face of the chuck and lower wall of the housing provided on adjacent faces with aligned concentric ball races, a series of balls in said races whereby said chuck is rotatable in the housing on an axis transversely to said horizontal axis, means at the lower side of said housing and chuck limiting upward axial movement of the chuck relative to the housing, means in threaded engagement with said journals for engagement with said chuck to hold the same against rotation relative to said housing, an indexing ring fixed on said chuck at the open upper side of the housing, and registrable indicia carried by said ring and housing.

2. Work holding apparatus comprising in combination, a support having transversely spaced vertically extending bearing members, a housing between said bearing members in the form of a cup open at its upper side and provided with journals on opposite sides thereof rotatable in said bearing members for swinging of said housing on a horizontal axis, said cup provided with a lower wall, a magnetized chuck within said housing having an upper work supporting face and a lower face, ball races carried by the lower face of the chuck and lower wall of the housing provided on adjacent faces with aligned concentric ball races, a series of balls in said races whereby said chuck is rotatable in the housing on an axis transversely to said horizontal axis, means at the lower side of said housing and chuck limiting upward axial movement of the chuck relative to the housing, means in threaded engagement with said journals for engagement with said chuck to hold the same against rotation relative to said housing, an indexing ring fixed on said chuck at the open upper side of the housing, and registrable indicia carried by said ring and housing, an arm fixed to one of said journals and indicia carried by one of said bearing members with which said arm is registrable.

AVIDES J. HAGOPIAN.

REFERENCES CITED

The following references are of record in the file of this patent:

UNITED STATES PATENTS

| Number | Name | Date |
|---|---|---|
| 408,259 | Pentz | Aug. 6, 1889 |
| 2,173,519 | Jones | Sept. 19, 1939 |
| 2,400,062 | Barrett | May 14, 1946 |
| 2,471,067 | Hitchcock | May 24, 1949 |